(12) United States Patent
Nguyen et al.

(10) Patent No.: US 6,401,157 B1
(45) Date of Patent: Jun. 4, 2002

(54) HOT-PLUGGABLE COMPONENT DETECTION LOGIC

(75) Inventors: Vincent Nguyen, Sugarland; Theodore F. Emerson, Houston, both of TX (US)

(73) Assignee: Compaq Information Technologies Group, L.P., Houston, TX (US)

(*) Notice: Subject to any disclaimer, the term of this patent is extended or adjusted under 35 U.S.C. 154(b) by 0 days.

(21) Appl. No.: 09/303,180

(22) Filed: Apr. 30, 1999

(51) Int. Cl.[7] .............................................. G06F 13/00
(52) U.S. Cl. ...................................... 710/302; 711/115
(58) Field of Search ................................ 710/100–304; 361/679–686; 711/115

(56) References Cited

U.S. PATENT DOCUMENTS

| | | | | | |
|---|---|---|---|---|---|
| 5,530,302 A | * | 6/1996 | Hamre et al. | ................ | 307/147 |
| 5,584,030 A | * | 12/1996 | Husak et al. | ................ | 713/300 |
| 5,754,797 A | * | 5/1998 | Takahashi | .................... | 710/103 |
| 5,758,102 A | * | 5/1998 | Carey et al. | ................. | 710/103 |
| 5,781,744 A | * | 7/1998 | Johnson et al. | ............. | 710/103 |
| 5,881,251 A | * | 3/1999 | Fung et al. | .................. | 710/103 |
| 5,886,431 A | * | 3/1999 | Rutigliano | .................. | 307/131 |
| 5,943,482 A | * | 8/1999 | Culley et al. | ................ | 361/798 |
| 5,951,660 A | * | 9/1999 | Wonterghem | ............... | 710/103 |
| 6,044,424 A | * | 3/2000 | Amin | ......................... | 710/103 |
| 6,047,343 A | * | 4/2000 | Olarig | ......................... | 710/102 |
| 6,062,480 A | * | 5/2000 | Evoy | ............................ | 235/492 |
| 6,115,766 A | * | 9/2000 | Bailis | .......................... | 710/103 |
| 6,131,134 A | * | 10/2000 | Huang et al. | ................ | 710/103 |
| 6,141,711 A | * | 10/2000 | Shah et al. | .................. | 710/103 |

* cited by examiner

Primary Examiner—Sumati Lefkowitz
(74) Attorney, Agent, or Firm—Conley, Rose & Tayon, P.C.

(57) ABSTRACT

A computer system having detection logic for detecting a hot-pluggable component module being added to the computer system. The detection logic determines when the hot-pluggable component module is fully inserted in a component connector, waits a predetermined time to insure that the hot-pluggable component module is properly seated in and electrical connections made to the component connector, and then notifies a hot-plug controller that a new component module is available for use in the computer system. The hot-pluggable component module, such as a memory module, may be used by the computer system as a replacement for a defective module, upgrade and/or addition without disturbing normal operation of the computer system.

20 Claims, 5 Drawing Sheets

HOT-PLUGGABLE COMPONENT DETECTION LOGIC

CROSS REFERENCE TO RELATED PATENT APPLICATION

This patent application is related to commonly owned U.S. patent application Ser. No. 09/303,369; filed Apr. 30, 1999; entitled "Replacement, Upgrade, and/or Addition of Hot-Pluggable Components in a Computer System" by Theodore F. Emerson, Vincent Nguyen Peter Michels and Steve Clohset, and is hereby incorporated by reference for all purpose.

BACKGROUND OF THE INVENTION

1. Field of the Invention

The present invention relates to a computer system having hot-pluggable component modules such as memory modules, and more particularly, to detecting hot-pluggable component modules when added to the computer system.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("e-mail"), document databases, video teleconferencing, whiteboarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. The personal computer thus has become an indispensable part of business and the economy. The network server plays an even more critical part in business computing by tying together the personal computer workstations into a network (LAN and WAN), and for storing and/or forwarding critical business information. This business information may comprise for example: databases, word processing, spreadsheets, drawings, graphics, e-mail, graphics, pictures, and the like. Therefore, it is imperative that there be a high availability of the computer system.

Replacement of defective components in a computer system or expanding the capabilities thereof, typically requires shutting down the computer needing service. If a defective component or upgrade is required in a network server, the potential for rendering inoperative all of the personal computers depending on that server is very high. The necessity for high availability of server operation has created hot-pluggable component designs as more fully described in commonly owned U.S. patent application Ser. No. 08/940,419, filed Sep. 30, 1997, entitled "Installation and Removal of Components of a Computer" by Sompong P. Olarig, Kenneth A. Jansen and Paul A. Santeler, and is hereby incorporated by reference. Hot-pluggable component designs, however, have typically required specially designed hardware and software modifications to the operating system software for implementation thereof.

There are some components in a computer system that may become defective but still function for their intended purpose for a period of time. For example, system memory comprising a plurality of random access memory (RAM) devices may have added circuitry for error checking and correction (ECC) which allows memory storage bit errors to be corrected without the data stored therein being corrupted. ECC covers up memory storage bit errors, but it does not fix the RAM device(s) causing the problem. Ultimately, the defective RAM device(s) must be replaced before further degradation, which ECC cannot correct, causes the computer system to become inoperative. Upgrading and/or adding RAM devices without shutting down the computer system is also highly desirable.

What is needed is a system, method and apparatus for detecting hot-pluggable component modules added to the computer system and used for the replacement of failing but functional computer components, upgrading and/or adding components without disturbing the normal operation of the computer system, without requiring specially designed hot-pluggable components, and without installing special operating system software patches.

SUMMARY OF THE INVENTION

The present invention overcomes the above-identified problems as well as other shortcomings and deficiencies of existing technologies by providing in a computer system an apparatus, method and system for detecting a hot-pluggable component module(s) added to the computer system while the computer system is in operation. An embodiment of the invention detects when a component module is plugged into a component connector on a motherboard or daughter board of the computer system. Once the component module is detected, the embodiment of the invention waits a certain time period before signaling control logic of the availability of the new component module. Detection of the component module when plugged into the component connector may be determined by completing an electrical connection of a pin(s) of the connector to system ground or voltage, or by connecting together two or more of the connector pins when the component module is inserted therein. The certain time period is selected to insure that the component module is properly seated in the connector and the certain time period will reset if the electrical connection is disturbed during this time period.

The added hot-pluggable component module(s) may be used for replacement of existing faulty components or expansion/addition of components without requiring the computer system to be brought off-line during operation thereof. Component replacement and/or expansion/addition of components may be performed by logic and firmware within the computer system, thus requiring no software operating system, application programming interface (API) or driver modifications. The embodiment of the present invention detects the addition of industry standard component modules to the computer system while the computer system is operating.

An example of a replacement component module is a random access memory (RAM) module that is plugged into a computer system memory connector. Other computer system components are contemplated herein and are within the scope of the invention. Some of these components may be, for example but not limitation: modem, network, video, SCSI, disk drive, and fibre channel interfaces; a processor in a multi-processor system, etc. An embodiment of the present invention detects when the RAM module is properly plugged into the memory connector.

The RAM module connectors or memory connectors are electrically isolated from the computer system memory bus with field effect transistor (FET) signal isolation buffers interposed between the connector signal pins and a memory controller. Power FET switches are interposed between the connector power pins and the computer system power buses. Each memory connector may also contain one or more software and/or hardware controllable light emitting diodes (LEDs) of various colors (electronically controllable) to indicate the status of the corresponding memory connector. Control and sense logic is implemented to control operation of the FET signal isolation buffers between the system memory controller and the memory connectors, the power FET switches between the computer system power bus(es) and the memory connectors, and LED status indication. This control and sense logic may monitor ("snoop") memory bus activity so that a memory connector may be connected to or disconnected from the memory bus when the memory bus in inactive, i.e., no read or write operations. The control and sense logic initiates connection of the memory connector/ added RAM module when the hot-plug detection logic signals at the added RAM module is present in the connector. Integration and operation of the hot-plug component modules is more fully described in commonly owned U.S. patent application Ser. No. 09/303,369; filed Apr. 30, 1999; entitled "Replacement, Upgrade, and/or Addition of Hot-Pluggable Components in a Computer System" by Theodore F. Emeron, Vincent Nguyen Peter Michels and Steve Clohset, and is hereby incorporated by reference herein.

In order to replace a faulty memory module, the contents of the faulty module must be copied to the replacement memory module. If the replacement module is not already installed in a memory connector, the operator is alerted and the replacement memory module is installed by a technician while the computer system remains operational. When the replacement memory module is installed the embodiment of the invention detects this replacement memory module, waits a period of time to insure that the module is properly seated in the connector then signals the hot-plug control logic that the replacement module is available.

On-line memory expansion is also accomplished by adding a new RAM module. The operating system, however, needs to be notified of the added memory module so that it can see and use it. The new memory module is inserted into a memory connector, its presence is detected by the embodiment of the invention and after the time period has ended, the new memory module is initialized and the operating system is informed of the added memory capacity.

A combination of replacing a faulty memory module(s) and upgrading memory may also be performed by installing a new memory module having a larger capacity then the faulty module. The replacement memory module is detected by the embodiment of the invention and after the time period has ended, the data from the faulty module is transferred to the new module, the remaining extra capacity of the new memory module is initialized, and the operating system is informed of the added memory capacity.

Other and further embodiments, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENT

Figure 1:
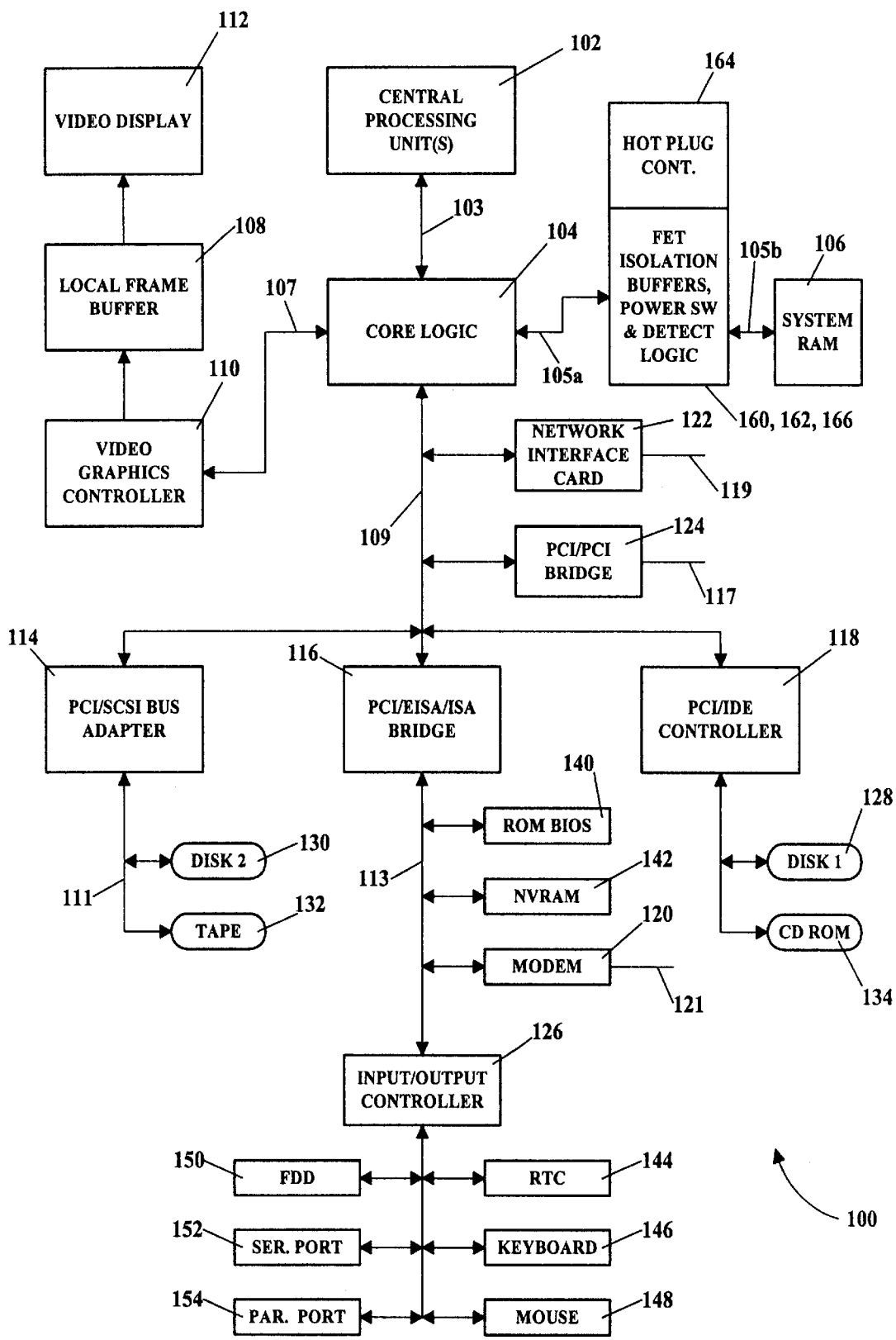
FIG. 1 is a schematic block diagram of a computer system according to the present invention.

The present invention is a system, method and apparatus in a computer for detecting a hot-pluggable component module(s) added to a computer system while the computer system is in operation. Detection logic of the embodiment of the invention detects when a new component module is plugged into a component connector on a motherboard or daughter board of the computer system. Once the new component module is detected, the embodiment of the invention waits a certain time period before signaling control logic of the availability of the new component module. Detection of the new component module plugged into the component connector may be determined by completing an electrical connection of a pin(s) of the connector to system ground or voltage, or by connecting together two or more of the connector pins when the component module is inserted therein. The certain time period is selected to insure that the new component module is properly seated in the connector and the certain time period will reset if the electrical connection is disturbed during this time period.

The new component module may be used to replace a failing but still operational component module. In addition, the new component module may further add increased capabilities to the computer (upgrade), or it may just add more capabilities without replacing any component module. Typically, the new component module, be it a replacement, upgrade and/or addition to the computer system will pluggably engage into a connector attached to a printed circuit board in the computer. For illustrative purposes, system random access memory (RAM) will be described as being representative of the new component module, however, it is contemplated herein and within the scope of the invention that a component module may comprise any function of a computer system.

For illustrative purposes, preferred embodiments of the present invention are described hereinafter for computer systems utilizing the Intel x86 microprocessor architecture and certain terms and references will be specific to that processor platform. It will be appreciated by those skilled in the art of computer systems that the present invention may be adapted and applied to any computer platform utilizing replaceable components such as plug-in RAM modules. The plug-in RAM modules may comprise industry standard single-inline-memory modules (SIMM), dual-inline-memory modules (DIMM), and the like.

Referring now to the drawings, the details of preferred embodiments of the present invention are schematically illustrated. Like elements in the drawings will be represented by like numbers, and similar elements will be represented by like numbers with a different lower case letter suffix.

Referring now to FIG. 1, a schematic block diagram of a computer system utilizing an embodiment of the present invention is illustrated. A computer system is generally indicated by the numeral 100 and comprises a central processing unit(s) (CPU) 102, core logic 104, system random access memory ("RAM") 106, a video graphics controller 110, a local frame buffer 108, a video display 112, a PCI/SCSI bus adapter 114, a PCI/EISA/ISA bridge 116, and a PCI/IDE controller 118. Single or multilevel cache memory (not illustrated) may also be included in the computer system 100 according to the current art of microprocessor computer systems. The CPU 102 may be a plurality of CPUs 102 in a symmetric or asymmetric multi-processor configuration. The video graphics controller 110 may be an AGP device (illustrated) connected to an AGP bus 107 or a PCI device (not illustrated) connected to the PCI bus 109.

The CPU(s) 102 is connected to the core logic 104 through a host bus 103. The system RAM 106 is connected to the core logic 104 through a memory bus 105. The video graphics controller 110 is illustrated connected to the core logic 104 through the AGP bus 107. The PCI/SCSI bus adapter 114, PCI/EISA/ISA bridge 116, and PCI/IDE controller 118 are connected to the core logic 104 through a PCI bus 109. Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard 300 (see FIG. 3).

Hard disk 130 and tape drive 132 may be connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, a serial port 152, and a parallel port 154. The EISA/ISA bus 113 is a slower information bus than the PCI bus 109, but it costs less to interface with the EISA/ISA bus 113. The PCI/IDE controller 118 interfaces hard disk 128 and CD ROM drive 134 to the PCI bus 109.

The system RAM 106 comprises at least one memory module such as, for example but not limitation, a single-in-line memory module (SIMM), dual-in-line memory module (DIMM) and the like. The SIMM or DIMM is adapted to plug into a mating connector located on a printed circuit board of the computer system 100. The printed circuit board may be a motherboard 300 (see FIG. 3) or it may be a "daughter board" (not illustrated) which is connected to the motherboard 300 by, for example, plugging into a daughter board socket on the motherboard 300 or connected thereto by a cable. The daughter board may be, for example, a memory riser card for retrofitting the invention onto an existing computer system motherboard.

Electronic signal isolation buffers such as field effect transistors (FETs) 160, and power switches such as power FET switches 162 are interposed between each of the hot-pluggable connectors 402 (see FIG. 4), the memory buses 105a and 105b, and the computer system power, respectively. Also on the same printed circuit board is a hot-plug controller 164 which comprises control and timing logic used to control the operation of the FET signal isolation buffers 160 and power FET switches 162, and determine when a RAM 106 module is plugged into or removed from its associated connector 402. The hot-plug controller 164 also may determine whether the correct number of RAM 106 modules are plugged into the connectors 402. The hot-plug controller 164 may further be used to control the connection and disconnection of the hot-pluggable connectors 402 (see FIG. 4) from the memory controller 204 (see FIG. 2) in a synchronous fashion, i.e., powering up of the new RAM 106 module with the power FET switches 162 so that the new module circuits become stabilized and initialized, then connecting the new RAM 106 module in the connector 402 with the FET signal isolation buffers 160 to the memory bus 105a only when the memory bus 105a is inactive (no address and/or data being asserted). For the failing RAM 106 module, the memory bus 105a is disconnected during an inactive time by the FET signal isolation buffers 160, and then the power is disconnected from the connector 402 by the power FET switches 162. The hot plug controller 164 a receives signal(s) from detection logic 166 which indicates that a new RAM 106 module has been plugged into the connector 402. The detection logic 166 determines that the new RAM 106 module has been plugged into the connector 402 by monitoring a pin connection which changes its resistance, voltage or current value after the RAM 106 module is plugged therein. The detection logic 166 waits a certain period of time to insure that the RAM 106 module is properly seated in the connector 402.

The System Management Interrupt (SMI#) input of the x86 microprocessor 102 may be used to inform the microprocessor 102 that a system management interrupt service routine needs to be performed. This service routine may be stored as firmware in the computer system read only memory basic input output system (ROMBIOS) 140, and an image thereof may be transferred during power-on-self-test (POST) to protected System Management (SM) address space located in the computer system RAM 106. Software may be used to inform external logic (hot-plug control 164) that the processor 102 is in System Management mode (SMM). Once in SMM, the System Management RAM (SMRAM)(part of the RAM 106) may be accessed through the SM address space. The SMRAM contains the program of the embodiments of the present invention which controls operation of the microprocessor. The SMM eliminates special customized software drivers and operating system modifications for operation of the present invention, since the software code of the invention may be executed from a completely separate address space which is transparent to other system software. A more detailed description of the operation of the SMM may be found in the Intel Corporation specifications for the PENTIUM™ and PENTIUM PRO™ (trademarks of Intel Corp.) microprocessors. These specifications are incorporated by reference herein. Other types of microprocessors may have similar operational features and it is contemplated herein and within the scope of the invention that computer systems using other types of microprocessors will similarly benefit from embodiments of the invention.

Figure 2:
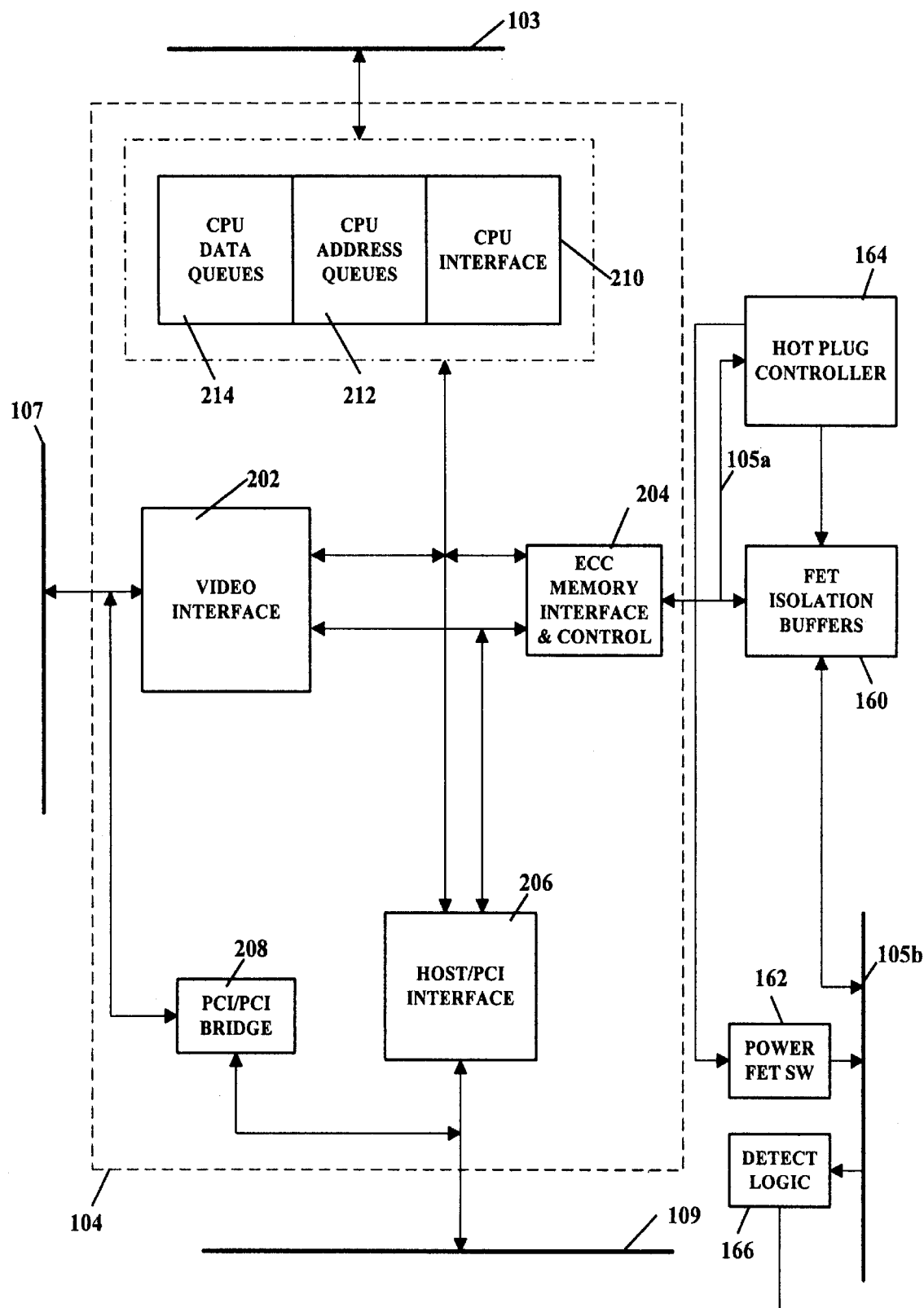
FIG. 2 is a schematic block diagram of a portion of the computer system of FIG. 1 illustrating an embodiment of the invention.

Referring to FIG. 2, a schematic block diagram of a portion of the computer system of FIG. 1 is illustrated. The core logic 104 comprises an AGP video interface 202, memory interface and control 204, a host/PCI interface 206, a PCI/PCI bridge 208, CPU interface 210, CPU address queues 212, and CPU data queues 214. A hot plug controller 164, and FET signal isolation buffers 160 and power FET switches 162 are interposed between the memory bus 105 and system power, respectively. The hot plug controller 164 may be a separate application specific integrated circuit (ASIC) and used in conjunction with a standard core logic 104 chipset, or it may be part of the core logic 104 chipset. The FET signal isolation buffers 160 and power FET switches 162 may be contained in integrated circuit packages that are proximate to the respective RAM connectors 402 (see FIG. 4). The detection logic 166 may be part of the hot plug controller 164 or may be separate integrated circuit packages that are proximate to the respective RAM connectors 402. The detection logic 166 monitors the connectors 402 for a RAM 106 module being plugged therein. When the RAM 106 module is detected as being plugged into the connector 402, the detection logic 166 waits a period of time, for example but not limitation, five seconds, then signals the hot plug controller 164 that the RAM 106 module is available to be connected to the system power (not illustrated) and the memory bus 105a, by the power FET switches 162 and FET signal isolation buffers 160, respectively.

Figure 3:
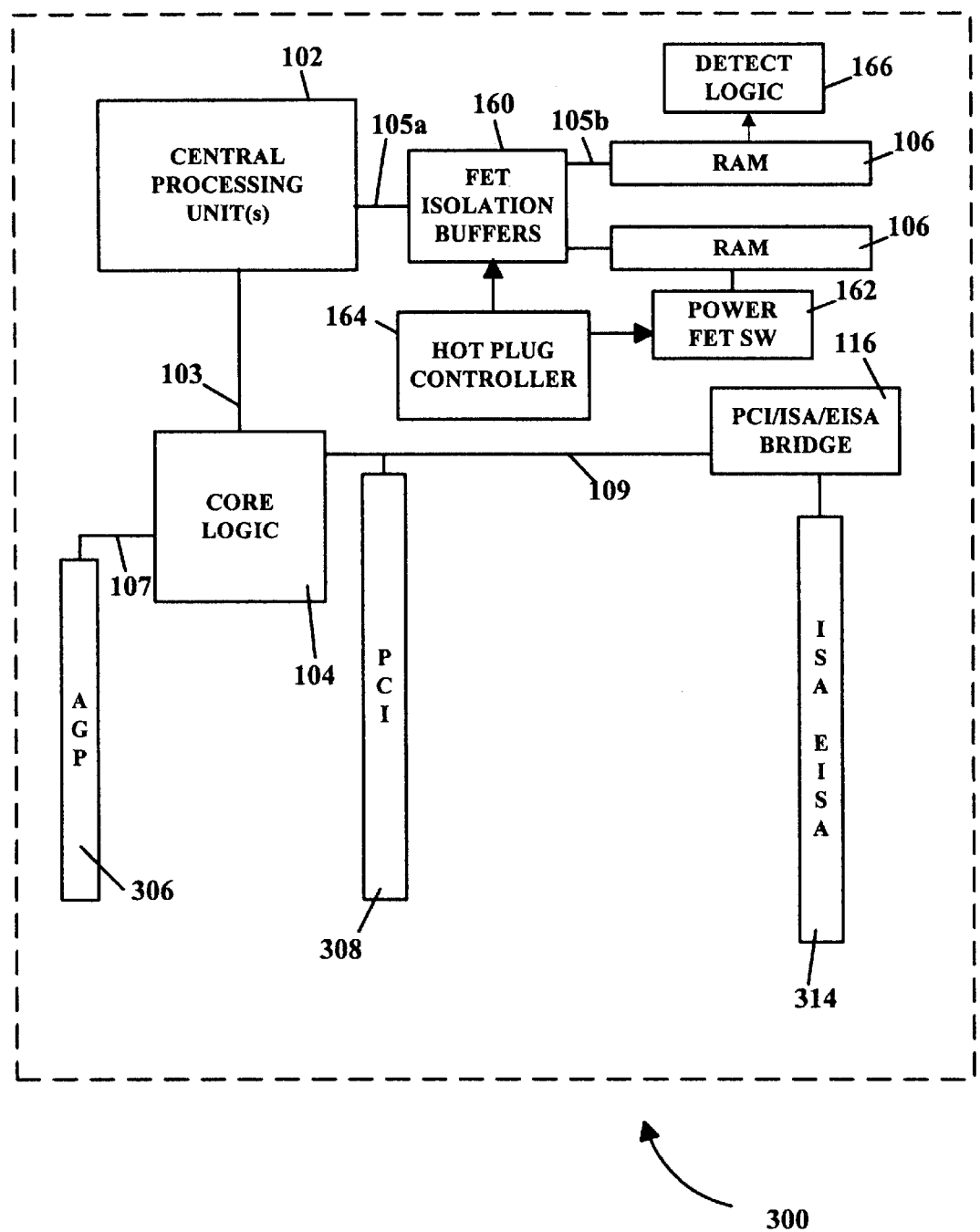
FIG. 3 is a schematic block diagram in plan view of a computer system motherboard with logic components and connectors thereon.

Referring now to FIG. 3, a schematic block diagram in plan view of a computer system motherboard with logic components and connectors thereon is illustrated. The computer system 100 motherboard is represented generally by the numeral 300. The core logic 104 chipset, CPU 102, AGP connector 306, PCI connectors 308, PCI/ISA/EISA bridge 116, and ISA/EISA connectors 314 may be located on the motherboard 300. The FET isolation buffers 160, power FET switches 162, hot plug controller 164, detection logic 166 and connectors 402 (FIG. 4) for the RAM 106 modules may be located on the motherboard 300, or alternatively, on a daughter board (not illustrated). The RAM 106 connectors may be adapted to receive standard SIMM or DIMM.

Figure 4:
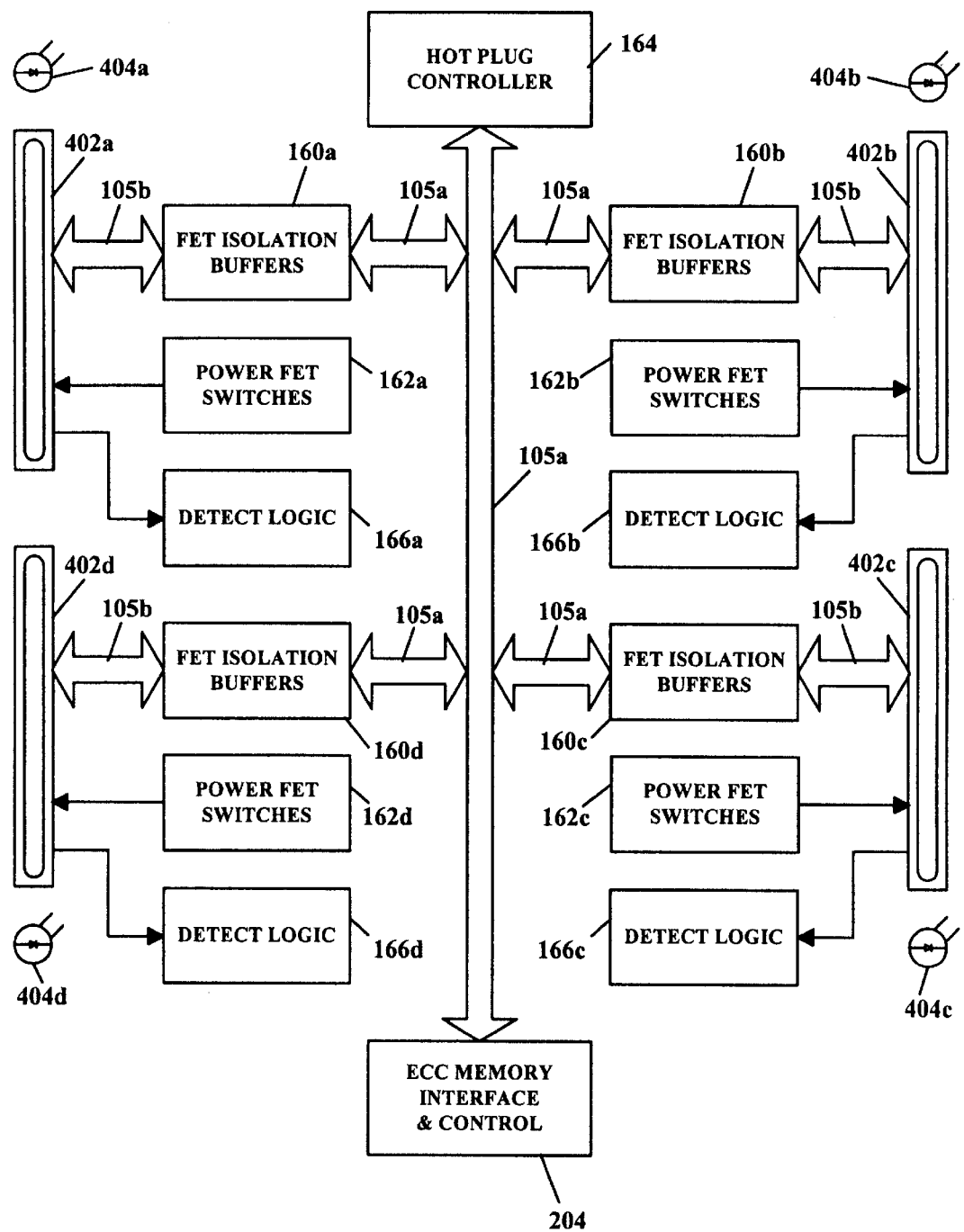
FIG. 4 is a schematic block diagram of a portion of the computer system illustrated in FIGS. 2 and 3.

Referring now to FIG. 4, a schematic block diagram of the embodiment of the present invention is illustrated. For illustrative clarity, only the connectors and circuits for four RAM 106 modules are illustrated. Any number of connectors and circuits for any number of RAM 106 modules are contemplated herein and within the scope of the present invention. SIMM or DIMM connectors 402 are connected to the FET isolation buffers 160 which connect to the memory controller bus 105a. The hot-plug controller 164 controls the operation of the FET signal isolation buffers 160 and power FET switches 162, as more fully described hereinafter. The detection logic 166 determines when a RAM 106 module is plugged into a connector 402, and signals the hot-plug controller 164 of this event.

When the RAM 106 module is detected as being plugged into the connector 402, the detection logic signals the hot-plug controller 164 after a period of time has elapsed so as to insure that the RAM 106 module is properly seated in the connector 402. Then the hot-plug controller 164 causes the power FET switches 162 to connect the power pins of the connector 402 to the computer system power bus (not illustrated), and, after the circuits of the RAM 106 module have had time to stabilize, the FET signal isolation buffers 160 connect the memory controller address, control and data bus 105a to the signal pins of the connector 402. Light emitting diode (LED) 404 indicators may be strategically located next to their associated connectors 402 for indication of status and operation thereof, and any RAM 106 module plugged therein. The hot-plug controller 164 may control the LEDs 404, and may also have circuits for snooping the memory bus 105a for memory read and write activities.

According to the embodiment of the invention, a technician may insert the new RAM 106 module(s) into an empty connector(s) 402 and the detection logic 166 detects the presence of this new RAM 106 module by, for example but not limitation, the RAM 106 module grounding a signal connection in the connector 402. Once the presence of a RAM 106 module is detected, the detection logic 166 waits a period of time, for example five seconds, before notifying the hot-plug controller 164. The hot-plug controller generates an SMI, and the SMI routine reads a status resister and identifies what RAM 106 module(s) has been installed in which previously empty connector(s) 402. The SMI routine causes the hot-plug controller 164 to apply power to the corrector 402 with the power FET switches 162. This allows the new RAM 106 module to stabilize and initialize its circuits before they are connected to the memory bus 105a by the FET signal isolation buffers 160. Details of replacement, upgrade or addition of the new RAM 106 module to the computer system is more fully described in commonly owned U.S. patent application Ser. No. 09/303,369; filed Apr. 30, 1999; entitled "Replacement, Upgrade, and/or Addition of Hot-Pluggable Components in a Computer System" by Theodore F. Emerson, Vincent Nguyen, Peter Michels and Steve Clohset, and is hereby incorporated by reference herein.

Figure 5:
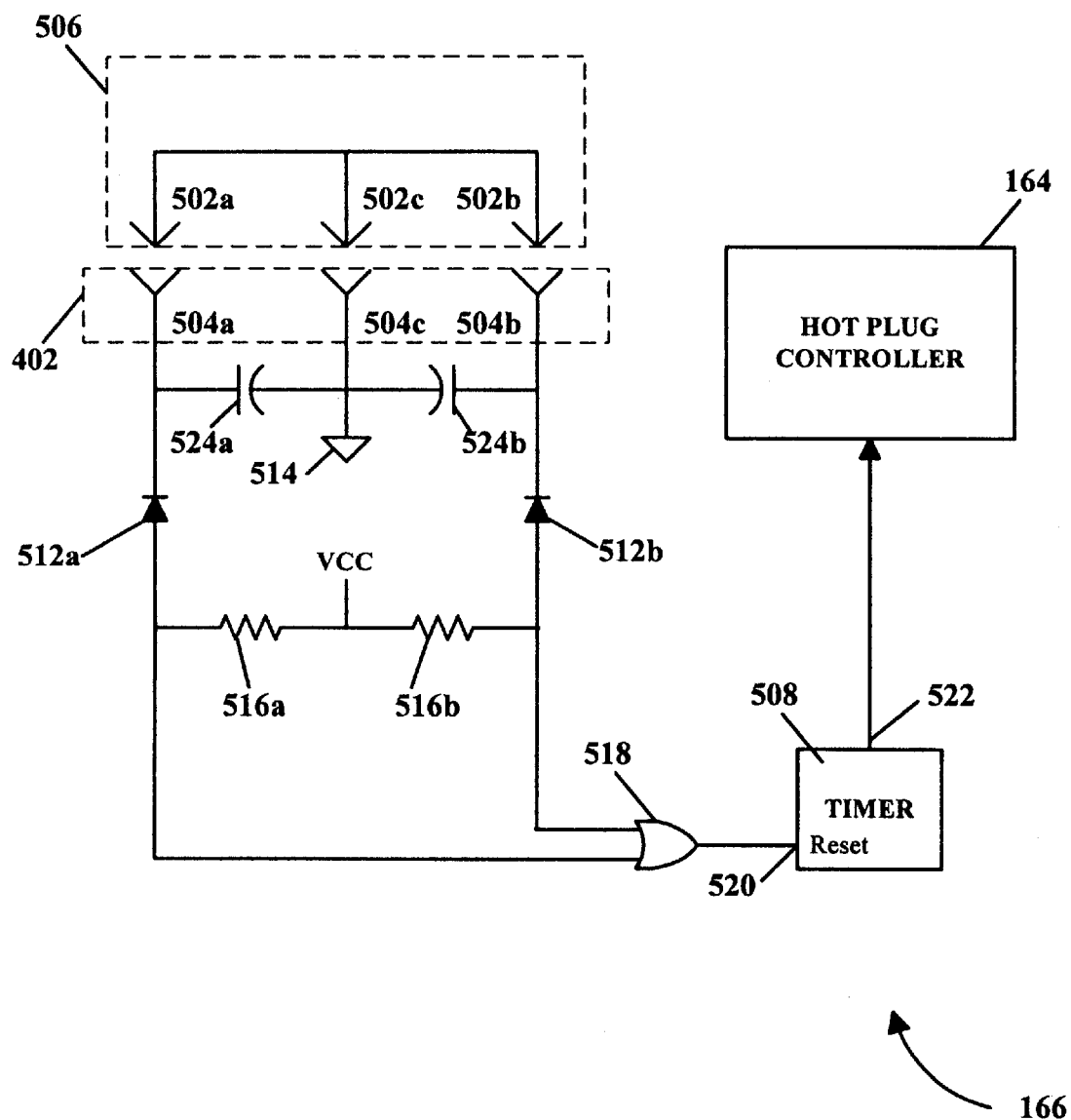
FIG. 5 is a schematic diagram of the detection logic according to an embodiment of the invention.

Referring now to FIG. 5, a schematic diagram of the detection logic 166 and signals thereof is illustrated, according to the embodiment of the invention. An edge connector 506 of the RAM 106 module is plugged into the connector 402. On the edge connector 506 are connector pins 502a, 502b and 502c which are connected together. Three edge connector 506 pins 502a, 502b and 502c are shown for illustrative clarity, however, it is contemplated and within the scope of the invention that any number of the edge connector 506 pins 502 may be used with the embodiment of the invention. Pins 502a and 502b may be located on opposite ends of the edge connector 506 and the pin 502c may be located toward the center of the edge connector 506. Preferably, the location and spacing of the pins 502a and 502b will enable the detection logic 166 to have a high degree of certainty that the edge connector 506 is properly inserted into the connector 402 as more fully described hereinbelow. Pins 502a, 502b and 502c are pins normally used for ground connections on the standard component module and are tied together.

The connector 402 has three pins 504a, 504b and 504c that are adapted for connection to the edge connector 506 pins 502a, 502b and 502c. Pin 504c is connected to a system ground 514. The cathodes of diodes 512a and 512b are connected to pins 504a and 504b, respectively. Capacitors 524a and 524b also are connected to the pins 504a and 504b, respectively, and may be used to bypass these pins effectively to ground at alternating current operating frequencies. The anodes of diodes 512a and 512b are connected to first ends of pull up resistors 516a and 516b, respectively, and to inputs of the OR gate 518. The other ends of the pull up resistors 516a and 516b are connected to system logic voltage Vcc. When both of the cathodes of diodes 512a and 512b are connected to ground by the pins 504a and 504b, respectively, the inputs to the OR gate 518 will be substantially pulled to ground level, or a logic low, and the output of the OR gate 518 will then be at a logic low. If either or both of the inputs of the OR gate 518 are pulled to Vcc by pull up resistors 516a and 516b (one or both of the diodes 512a and 512b cathodes are not connected to ground), then the output of the OR gate 518 will be at a logic high.

A timer 508 has a reset input 520 and an output 522. The output 522 is connected to an input of the hot-plug controller 164 to indicate when a new module is available for connection to the computer system 100 The timer 508 may be programmed for a desired time period, for example but not limitation, five seconds. The desired period of time starts when the reset input 520 is a logic low, and after the desired period of time elapses, the output 522 goes from a logic low to a logic high. If the reset input 520 goes to a logic high anytime when the timer 508 has not yet reached the desired period of time, the timer 508 will reset back to the start of the desired period of time. The output of the OR gate 518 is connected to the reset input 520, and anytime the output of the OR gate 518 goes to a logic high (pins 504a or 504b are not grounded) the timer 508 will reset and restart the desired period of time. The timer may be, for example, a counter having an internal clock oscillator which drives the counter. The clock frequency and/or the number of stages of the counter may be used to determine the desired time period. Thus, all three of the edge connector 506 pins 502a, 502b and 502c must properly mate with the connector 402 pins 504a, 504b and 504c, respectively, for the desired time period before the timer 508 signals the hot-plug controller 164 that a new component module is available for connection to the computer system 100. The embodiment of the present invention contemplates detection logic 166 with each of the connectors 402 in the computer system 100. It is contemplated and within the scope of the invention that instead of using the OR gate 518, an AND gate, a NAND gate, or a NOR gate may be used with the appropriate logic level inputs.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having hot-pluggable components, said system comprising:
   a central processing unit;
   a component controller connected to said central processing unit;
   a component bus connected to said component controller;
   a plurality of component connectors adapted to receive component modules;
   a plurality of component bus switches connected between said component bus and said plurality of component connectors;
   a plurality of component power switches connected between said plurality of component connectors and a power source;
   a detection circuit adapted for determining when a new component module is installed in one of said plurality of component connectors; and
   a logic circuit connected to said detection circuit, said component bus, said plurality of component connectors, said plurality of component bus switches and said plurality of component power switches, wherein said detection circuit begins counting for a predetermined period of time once the new component is fully installed in one of said connectors and, upon expiration of said predetermined period of time, said detection circuit notifies said component controller of said component module being installed in the one of said plurality of component connectors;
   said component controller then causes some of said plurality of power switches to connect the one of said plurality of component connectors to said power source, and then said component controller causes some of said component bus switches to connect the one of said plurality of component connectors to said component bus when said component bus is inactive;
   said component controller asserting a system management interrupt to said central processing unit after the one of said plurality of component connectors is connected to said power source and said component bus; and
   when said central processing unit receives the system management interrupt said central processing unit runs a system management program for initializing said new component module and then the system management program notifies an operating system program of the availability of said new component module.

2. The computer system of claim 1, wherein said central processing unit is a plurality of central processing units.

3. The computer system of claim 1, wherein said plurality of component bus switches comprise a plurality of field effect transistor switches.

4. The computer system of claim 1, wherein said plurality of component power switches comprise a plurality of field effect transistor power switches.

5. The computer system of claim 1, wherein said new component module is selected from the group consisting of a random access memory, a network interface, a modem, a disk interface, a peripheral component interconnect (PCI) interface, an accelerated graphics port (AGP) interface, a co-processor, a universal serial bus (USB) interface, a fibre channel interface, an industry standard architecture (ISA) controller, an extension to industry standard architecture (EISA) controller, a super input-output (SIO) controller, and a small computer system interface (SCSI).

6. The computer system of claim 1, wherein said new component module is a random access memory (RAM) module, and said component controller is a memory controller having error checking and correcting logic.

7. The computer system of claim 1, wherein said detection circuit is a plurality of detection circuits and each of said plurality of detection circuits are connected to a one of said plurality of component connectors.

8. The computer system of claim 1, wherein said detection circuit determines when said new component module is installed in and removed from the one of said plurality of component connectors by sensing an electrical connection to said new component module and sensing a loss of the electrical connection to said new component module, respectively.

9. The computer system of claim 8, wherein said electrical connection is a plurality of electrical connections.

10. The computer system of claim 8, wherein said electrical connection is a connection to a ground of the computer system.

11. The computer system of claim 8, wherein said electrical connection is a connection to a power supply common of the computer system.

12. The computer system of claim 8, wherein said electrical connection is a connection to a voltage of the computer system.

13. The computer system of claim 1, wherein said detection circuit resets and does not notify said component controller if it senses during the specified time that said new component module is not fully installed.

14. The computer system of claim 1, wherein said detection circuit comprises a timer having a reset input and an output, the reset input connected to a signal pin of the one of said plurality of component connectors and the output connected to said logic circuit.

15. The computer system of claim 14, further comprising an OR gate having a plurality of inputs connected to respective ones of a plurality of pins of the one of said plurality of component connectors, and an output connected to the reset input of said timer, wherein when there are logic lows on all of the respective ones of the plurality of pins then said timer begins timing of the specified time, and if one of the respective ones of the plurality of pins goes to a logic high during the timing of the specified time then said timer resets to the beginning of the specified time.

16. The computer system of claim 14, further comprising an AND gate having a plurality of inputs connected to respective ones of a plurality of pins of the one of said plurality of component connectors, and an output connected to the reset input of said timer, wherein when there are logic highs on all of the respective ones of the plurality of pins then said timer begins timing of the specified time, and if one of the respective ones of the plurality of pins goes to a logic low during the timing of the specified time then said timer resets to the beginning of the specified time.

17. The computer system of claim 15, further comprising a plurality of diodes connected between the plurality of inputs of said OR gate and the respective ones of the plurality of pins of the one of said plurality of component connectors.

18. The computer system of claim 17, further comprising a plurality of voltage pull up resistors connected to the plurality of inputs of said OR gate.

19. A method, in a computer system comprising a central processing unit, a component controller connected to the central processing unit, a component bus connected to the component controller, a plurality of component connectors adapted to receive component modules, a plurality of component bus switches connected between the component bus and the plurality of component connectors; a plurality of component power switches connected between the plurality of component connectors and a power source; a detection circuit; and a logic circuit connected to the detection circuit, the component bus, the plurality of component connectors, the plurality of component bus switches and the plurality of component power switches; said method comprising the steps of:

installing a new component module into a one of the plurality of component connectors;

detecting the new component module in the one of plurality of component connectors;

waiting a predetermined time after the new component module has been fully installed and detected;

connecting the detected new component module to the power source and then to the component bus;

initializing the new component module connected to the component bus for operation in the computer system;

notifying a computer system operating software of the new component module; and utilizing the new component module in the computer system.

20. The method of claim 19, further comprising the step of resetting and starting the step of waiting the predetermined time again if the new component module is not detected at any time during the step of waiting the predetermined time.

\* \* \* \* \*